(12) United States Patent
Katzman

(10) Patent No.: US 12,325,220 B2
(45) Date of Patent: Jun. 10, 2025

(54) METHOD OF LAMINATING A FUNCTIONAL FILM ONTO AN OPTICAL ARTICLE AND OPTICAL ARTICLE

(71) Applicants: ESSILOR INTERNATIONAL, Charenton-le-Pont (FR); SHAMIR OPTICAL INDUSTRY LTD, Kibbutz Shamir (IL)

(72) Inventor: Youval Katzman, Kibbutz Shamir (IL)

(73) Assignee: Essilor International, Charenton-le-Pont (FR)

( * ) Notice: Subject to any disclaimer, the term of this patent is extended or adjusted under 35 U.S.C. 154(b) by 175 days.

(21) Appl. No.: 17/802,487

(22) PCT Filed: Feb. 25, 2021

(86) PCT No.: PCT/EP2021/054654
§ 371 (c)(1),
(2) Date: Aug. 25, 2022

(87) PCT Pub. No.: WO2021/170705
PCT Pub. Date: Sep. 2, 2021

(65) Prior Publication Data
US 2023/0106436 A1    Apr. 6, 2023

(30) Foreign Application Priority Data
Feb. 27, 2020 (EP) ..................... 20305198

(51) Int. Cl.
*B32B 38/18* (2006.01)
*B29C 63/00* (2006.01)
(Continued)

(52) U.S. Cl.
CPC ...... *B32B 38/1866* (2013.01); *B29C 63/0073* (2013.01); *B29D 11/0073* (2013.01);
(Continued)

(58) Field of Classification Search
CPC ................................................ B32B 38/1866
See application file for complete search history.

(56) References Cited

U.S. PATENT DOCUMENTS

2005/0121835 A1* 6/2005 Herod ..................... B29C 51/30
264/492
2007/0029026 A1   2/2007 Bolognese
(Continued)

FOREIGN PATENT DOCUMENTS

AU    2007217329      3/2012
CN    1805849 A       7/2006
(Continued)

OTHER PUBLICATIONS

Office Action, issued in Chinese Patent Application No. 202180014703.8 dated Nov. 28, 2023.
(Continued)

*Primary Examiner* — Virak Nguon
(74) *Attorney, Agent, or Firm* — NIXON & VANDERHYE

(57) ABSTRACT

This method of laminating a functional film onto an optical article includes: thermoforming the functional film so as to provide the functional film with a predetermined target curvature based on a curvature of a face of the optical article on which the functional film is to be applied; applying the functional film onto that face of the optical article; pressing the functional film against that face of the optical article so as to adhere the functional film to that face of the optical article. This method further includes heating the functional film at at least one predetermined temperature after the applying, so that the functional film conforms to the curvature of that face of the optical article.

17 Claims, 2 Drawing Sheets

(51) Int. Cl.
*B29D 11/00* (2006.01)
*B32B 37/10* (2006.01)
*B32B 38/00* (2006.01)

(52) U.S. Cl.
CPC ............ *B32B 37/10* (2013.01); *B32B 38/004* (2013.01); *B32B 2038/0048* (2013.01); *B32B 2307/40* (2013.01); *B32B 2310/0454* (2013.01); *B32B 2551/00* (2013.01)

(56) References Cited

U.S. PATENT DOCUMENTS

| | | | |
|---|---|---|---|
| 2007/0034322 A1 | 2/2007 | Glacet | |
| 2007/0138665 A1 | 6/2007 | Chen | |
| 2007/0195422 A1* | 8/2007 | Begon | B29C 63/16 359/642 |
| 2007/0270062 A1* | 11/2007 | Weber | B29C 66/545 442/65 |
| 2008/0314499 A1* | 12/2008 | Begon | B29C 63/0073 156/367 |
| 2011/0242657 A1* | 10/2011 | Glacet | C09J 119/02 156/275.5 |
| 2012/0090776 A1* | 4/2012 | Hsu | B29D 11/0073 156/497 |
| 2013/0221551 A1* | 8/2013 | Genda | B29D 11/00442 264/1.36 |
| 2016/0002504 A1 | 1/2016 | Glacet | |

FOREIGN PATENT DOCUMENTS

| | | |
|---|---|---|
| CN | 101321616 A | 12/2008 |
| CN | 101389985 A | 3/2009 |
| CN | 102202876 A | 9/2011 |
| EP | 2 011 604 | 1/2009 |
| EP | 2 349 696 | 8/2011 |
| WO | 03004255 A2 | 1/2003 |
| WO | 2004/110747 | 12/2004 |
| WO | 2006105999 A1 | 10/2006 |
| WO | 2010/053862 | 5/2010 |

OTHER PUBLICATIONS

Extended European Search Report for EP Application No. 20305198.2 dated Aug. 27, 2020, 7 pages.
International Search Report for PCT/EP2021/054654 dated May 11, 2021, 3 pages.
Written Opinion of the ISA for PCT/EP2021/054654 dated May 11, 2021, 6 pages.

* cited by examiner

METHOD OF LAMINATING A FUNCTIONAL FILM ONTO AN OPTICAL ARTICLE AND OPTICAL ARTICLE

CROSS-REFERENCE TO RELATED APPLICATIONS

This application is the U.S. national phase of International Application No. PCT/EP2021/054654 filed Feb. 25, 2021 which designated the U.S. and claims priority to EP Patent Application No. filed Feb. 27, 2020, the entire contents of each of which are hereby incorporated by reference.

FIELD OF THE DISCLOSURE

The present disclosure relates to a method of laminating a functional film onto an optical article such as an ophthalmic lens.

BACKGROUND OF THE DISCLOSURE

By "functional film", what is meant is a film providing the optical article with at least one feature among a hard coat, anti-scratch properties, an antireflective coating, a polarizing film, a tint, a mirror or a filter for specific wavelengths, anti-shock, anti-smudge, anti-fog, self-healing, self-cleaning or antistatic properties, etc.

By "laminating" a film on an optical article, what is meant is the operation involving the deposition of a film on a surface of the optical article to be laminated.

The lamination operation is usually performed by first providing the film disposed onto a carrier. The film and the carrier are then compressed onto the surface to be laminated, by applying a difference of pressure between a side of the carrier having both the film and the optical article and the other side, or by applying a force from the optical article side.

An adhesive, e.g. a pressure sensitive adhesive, is generally previously disposed on the face of the film which is intended to be pressed onto said surface so as to maintain the film on said surface.

In alternative processes, the adhesive is positioned onto the optical article prior to pressing the film onto the optical article and/or the film is pressed onto the optical article without being fixed to a carrier, but for example by applying pressure directly on the film or by using a stamp or a blown membrane or balloon.

In the field of optical article manufacturing, the film lamination process generally requires pre-processing or "thermoforming" the consumable or laminate complex, in order to shape the film with a given curvature, so as to comply with the surfaced prescription of the ophthalmic lens to be laminated, be it the convex or concave side of the lens.

However, the thermoformed curvature may differ from that of the surface it is laminating, in one or more axes and/or regions. In some cases, the thermoformed curvature is substantially spherical, whereas the curvature of the surface is aspherical, e.g. cylindrical, or progressive (referring to progressive addition lenses).

In case the thermoformed curvature differs from the surface curvature, after lamination, there will be stress within the laminate, as the film is constrained to accommodate the surface curvature by the adhesive.

This may increase the instances of delamination, visible defects and/or other imperfections in the laminated lens. FIG. 1 illustrates the phenomenon of delamination, consisting in a mismatch M between a film 6 and an optical article surface curvature 8 in the cross-section axis. Thus, the adhesive does not adhere the film to the surface of the optical article.

A known solution for preventing this problem is to thermoform the laminate such that the thermoformed curvature matches the optical article surface curvature as precisely as possible, e.g. by matching the curvature in more locations than just on the meridian of the laminate, or by controlling the other forming parameters, i.e. flow rate, temperature, pressure, etc.

However, this process cannot be optimized for all cases, as optical articles such as ophthalmic lenses are "freeform" surfaces and variables curvatures can be found over the surface of a given lens.

SUMMARY OF THE DISCLOSURE

An object of the disclosure is to overcome the above-mentioned drawbacks of the prior art.

To that end, the disclosure provides a method of laminating a functional film onto an optical article, comprising:

thermoforming the functional film so as to provide the functional film with a predetermined target curvature based on a curvature of a face of the optical article on which the functional film is to be applied;

applying the functional film onto that face of the optical article;

pressing the functional film against that face of said optical article so as to adhere the functional film to that face of the optical article;

wherein the method further comprises heating the functional film at at least one predetermined temperature after the applying, so that the functional film conforms to the curvature of that face of the optical article.

As the film is adhered to the optical article surface at the time of heating, the heat forms the film laminate conforming to the lens surface curvature, thereby improving adhesion and preventing delamination.

The disclosure also provides an optical article comprising a front face and a rear face, wherein at least one of the front and rear faces is coated by a functional film laminated onto the optical article by implementing a laminating method as succinctly described above.

As the optical article according to the disclosure has the same advantages as the laminating method, they are not repeated here.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF THE DISCLOSURE

In the description which follows, although making and using various embodiments are discussed in detail below, it should be appreciated that as described herein are provided many inventive concepts that may embodied in a wide variety of contexts. Embodiments discussed herein are merely representative and do not limit the scope of the disclosure. It will also be obvious to one skilled in the art that all the technical features that are defined relative to a process can be transposed, individually or in combination, to a device and conversely, all the technical features relative to a device can be transposed, individually or in combination, to a process and the technical features of the different embodiments may be exchanged or combined with the features of other embodiments.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises", "has", "contains", or "includes" one or more steps or elements possesses those one or more steps or elements, but is not limited to possessing only those one or more steps or elements.

Figure 1:
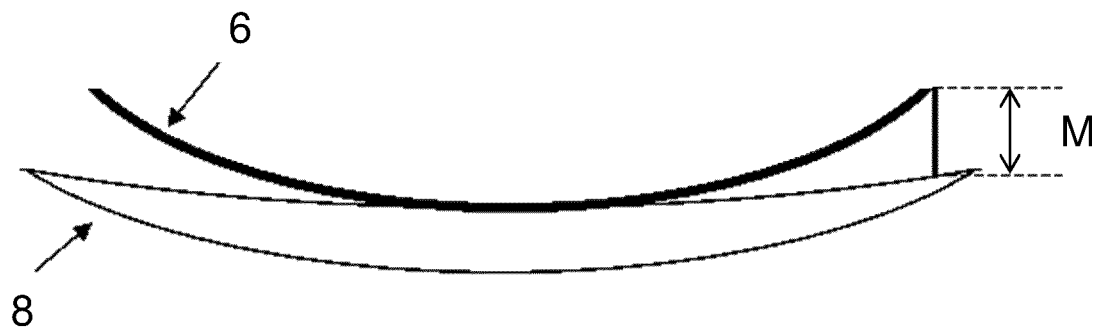
FIG. 1 illustrates an example of a prior art delamination phenomenon.
Figure 2:
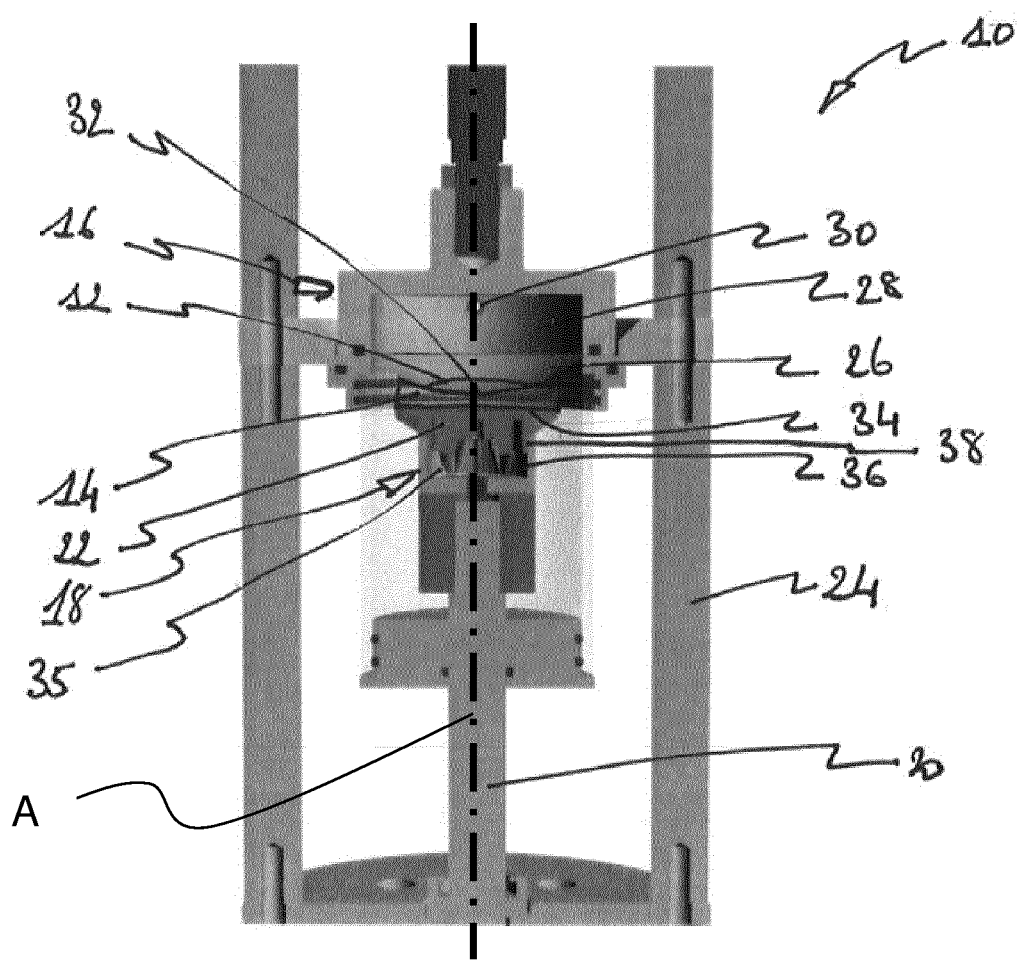
FIG. 2 is a schematic view of a lamination machine suited for implementing a lamination method according to the disclosure.

FIG. 2 shows a lamination machine 10 for laminating a functional film 12 onto an optical article 14, in a lamination operation wherein the functional film 12 and the optical article 14 are in contact with each other.

The optical article may be an ophthalmic lens. Preferably, the optical article 14 has dimensions at least equal to the final dimensions of the ophthalmic lens. "Final" dimensions means the dimensions of the ophthalmic lens or optical article 14 at the end of the manufacturing process, when the ophthalmic lens or the optical article 14 is ready to be worn by a user or mounted in a frame. Preferably, the dimensions of the ophthalmic lens or optical article 14 at the time of the lamination process are greater than its final dimensions. In this latter case, the final contour of the ophthalmic lens or optical article 14 is obtained with a cutting or edging step.

The optical article 14 comprises a first face 32 which is intended to be laminated and a second face 34 which is intended to be disposed against a surfacing blocker 22. The first face 32 is concave. Alternatively, the first face 32 may be of any form, e.g. convex or planar. The geometry of the first face 32 depends on the ophthalmic lens power desired for the optical article 14 when the optical article 14 is an ophthalmic lens.

Laminating the functional film 12 may provide the laminated face of the optical article 14 with at least one coating among a hard coat, an anti-scratch coating, an antireflective coating, a polarizing coating, a tinted coating, a mirror coating, a coating filtering a predetermined range of wavelengths, an anti-smudge coating, an anti-fog coating, an antistatic coating, a coating having self-healing and/or self-cleaning properties, etc.

The functional laminated film 12 may comprise a main film made of cellulose triacetate (TAC), polyethylene terephthalate (PET), polycarbonate (PC), polyvinyl alcohol (PVA), or cyclic olefin copolymer (COC). Alternatively, the functional film 12 may be made of a combination of these materials.

Furthermore, the functional film 12 may comprises a plurality of layers. These layers may be composed of different materials. These layers may also provide the optical article 14 with different features as described above. Preferably, these layers are superposed one above the other and have the same peripheral dimensions to form a multi-layer film with a uniform perimeter.

The functional film 12 may have an elongated shape. In other words, the functional film 12 preferably comprises a first dimension greater than a second dimension perpendicular to the first dimension. Most preferably, the functional film 12 has an oblong shape. Furthermore, the functional film 12 has dimensions at least corresponding to the final dimensions of the optical article 14. Hence, the functional film 12 has dimensions making it possible to cover the entire surface of at least one side (also referred to herein as one "face") the final optical article 14. However, the functional film 12 may have dimensions smaller than the optical article before the afore-mentioned step of edging i.e. the base lens. Alternatively, the functional film 12 may have dimensions making it possible to partly cover the surface of the final optical article 14.

The functional film 12 may comprise an orientation axis. The orientation axis may be defined depending on at least one among a polarizing direction, an antireflective or reflective gradient, a tint gradient and an inscription positioning. The function film 12 may comprise an orientation indicator. In the case where the functional film 12 is elongated, the orientation axis may extend along or perpendicular to the extension axis of the functional film 12 in a predetermined manner. That greater dimension may form a visual indicator for the orientation axis.

The orientation axis is advantageously aligned with the nasal-temporal axis of the ophthalmic lens when the ophthalmic lens gets its final shape, in order to avoid misalignment defects that may otherwise occur, leading the ophthalmic lens to have portions without any functional film 12. Furthermore, the orientation axis is advantageously disposed in a predetermined orientation when the functional film 12 has a polarization axis. In the same way, the orientation axis is advantageously disposed in a predetermined orientation and position with regard to a center point and the nasal-temporal axis of the ophthalmic lens, notably when the functional film 12 provides an antireflective or reflective linear or curved gradient, a tint linear or curved gradient, an inscription positioning or an optically active element.

The lamination machine 10 comprises a film support 16 for receiving the functional film 12 to be laminated and an article support 18 configured to receive and position the optical article 14 in a predetermined orientation.

In the example of FIG. 2, the functional film 12 is positioned on an external side of a carrier 26 which is intended to face and then contact the optical article 14. The carrier 26 is fastened to the film support 16, for example by means of an adhesive or by a clamping system.

The lamination machine 10 further comprises an actuating member 20 configured to move the film support 16 and the article support 18 toward each other at least until the functional film 12 is fully contacting the surface to be laminated. This movement is performed at least along a longitudinal lamination axis A. Preferably, the longitudinal axis A is orthogonal to the surface of the optical article 14 to be laminated at a central point of the optical article 14, e.g. at the geometric center of one side (face) of the optical article 14.

The actuating member 20 may further be configured to move the film support 16 and the article support 18 toward each other along a plurality of lamination axes. That movement may be linear or non-linear. The predetermined orientation provided by the article support 18 is preferably a predetermined angular position about the longitudinal lamination axis A.

In the example shown in FIG. 2, the actuating member 20 is coupled to the article support 18 to displace the article support 18 toward the film support 16 which is fixed with regard to a frame 24. Alternatively, the actuating member 20 may be coupled to the film support 16 to displace it toward the article support 18. Alternatively, the actuating member 20 may be coupled to both the article support 18 and the film support 16. The actuating member 20 is for example a cylinder having the article support 18 or the film support 16 coupled at an end thereof.

The lamination is configured to be performed at a predetermined pressure or predetermined pressure difference applied onto the optical article 14 received within the article support 18. The predetermined pressure difference applied onto the optical article 14 through the functional film 12 may be between 0.01 MPa and 1 MPa, preferably between 0.3 MPa and 0.6 MPa, preferably of about 0.5 MPa. That predetermined pressure difference depends on the dimensions of the optical article 14, particularly the area of the surface to be laminated.

To apply that predetermined pressure onto the optical article 14, the functional film 12 is disposed on the carrier 26 which acts as a membrane. A positive difference of pressure may be applied between a first side of the carrier 26 and a second side of the carrier 26 carrying the functional film 12 which is pressed against the optical article 14. The predetermined pressure difference corresponds to the pressure difference between the two sides of the carrier 26 before application of the carrier 26 onto the optical article 14.

In the example of FIG. 2, the film support 16 and the carrier 26 form a cavity 28 with a second side of the carrier 26 forming a lower wall of the cavity 28.

The film support 16 comprises an inlet port 30 communicating with the cavity 28 to allow a pressuring device (not shown) to regulate the pressure in the cavity 28.

The article support 18 is configured to transmit laminating forces induced by that predetermined pressure to the lamination machine 10 during the lamination. Hence, the article support 18 is configured to withstand the predetermined pressure difference applied onto the optical article 14. More particularly, the article support 18 is configured to support the optical article 14 in withstanding the predetermined pressure difference applied onto most or even the whole of the surface of the optical article 14.

The article support 18 is a blocker support. In other words, the article support 18 is configured to receive a blocker onto which an optical article 14 is fixed and preferably provide it with a forced predetermined orientation with regard to the lamination machine 10.

A "blocker" is a support piece comprising at a first side a mounting face onto which an optical article 14 is intended to be fixed and at a second side opposite to the first side a clamping portion which is configured to cooperate with a blocker support. The blocker allows the optical article 14 to be well maintained during a manufacturing process, as for example surfacing, edging or lamination operations. Particularly, the blocker makes it possible to maintain the optical article 14 in a predetermined position and orientation. The blocker is thus the interface piece between the optical article 14 and the machine, here the lamination machine 10.

A blocker is also known as a block, a blocking piece, a lens chuck or a surface block.

The blocker is attached or fixed to the optical article 14 by means of a blocking material which is preferably an ultra-violet and/or visible light curable adhesive blocking composition as disclosed in EP 2 011 604 A1. Alternatively, the blocking material may be plastic material including e-caprolactone, terpolymer derived from ethyl-methyl-acrylate-acrylic acid, polycarbonate, polyethylene (PET), high methacrylate resin, ethyl methacrylate resin, methacrylate copolymer resin, butyl methacrylate resin, and methyl/n-butyl methacrylate copolymer resin. In some alternatives, the blocking material may be a metal alloy with a low fusion temperature.

The laminating forces applied onto the optical article 14 are thus transmitted to the blocker which also transmits these laminating forces to the article support 18 or the blocker support. In other words, the blocker makes it possible to support the optical article 14 in bearing the laminating forces. Accordingly, this makes it possible to limit the risks for the laminating forces to deform or break the optical article 14 or part of the optical article 14.

The article support 18 is further configured to receive the surfacing blocker 22 onto which the optical article 14 is to be disposed for lamination. In other words, the article support 18 is compatible with the surfacing blocker 22. A "surfacing" blocker corresponds to a blocker that is configured to be received by a blocker support of a surfacing machine and to withstand forces involved by the surfacing operation, without any plastic deformation of the blocker. In other words, the surfacing blocker 22 is configured to transmit surfacing forces applied thereto by the optical article 14 to the blocker support and helps maintaining the optical article 14 fixed to the article support 18 despite such forces being applied.

Providing an article support 18 configured to receive the surfacing blocker 22 makes it possible to avoid supplementary deblocking and blocking steps when a surfacing operation is planned before or after the lamination operation. Indeed, in a manufacturing process comprising a step of surfacing and a step of lamination, avoiding a supplementary step of deblocking the optical article 14 from a first blocker, e.g. the surfacing blocker 22, and a supplementary step of blocking the optical article 14 on a second blocker, e.g. a specific blocker for lamination machine, makes it possible to reduce the manufacturing process duration, defects that may appear in the lens and/or errors generated during film positioning.

Furthermore, this makes it possible to reduce the apparition of misalignment defects and allows to suitably position the orientation axis of the functional film 12. Using a same blocker for surfacing and lamination steps allows the functional film 12 to be perfectly aligned with the referential used for surfacing and for providing the expected optical function.

The surfacing blocker 22 has at least one bearing surface 38 for the transmission of surfacing forces to a surfacing machine during a surfacing operation. The article support 18 comprises at least one supporting surface 36 configured to contact the at least one bearing surface 38 when the surfacing blocker 22 is received in the blocker support to transmit laminating forces induced by the predetermined pressure.

In an embodiment, the at least one supporting surface 36 is complementary shaped with regard to the at least one bearing surface 38. In other words, the at least one supporting surface 36 is configured to be in surfacing contact with the at least one bearing surface 38. A shape complementarity makes it possible to provide a more stable and precise contact between two contacting surfaces. When the surfacing blocker 22 comprises one bearing surface 38, this bearing surface is preferably circular in shape. Preferably, the article support 18 comprises a plurality of supporting surfaces 36 configured to contact a plurality of bearing surfaces 38 of the blocker. In the latter case, the plurality of supporting surfaces 36 is complementary shaped with regard to the plurality of bearing surfaces 38.

The supporting and bearing surfaces 36, 38 may be planar, circular in shape or a combination thereof. Hence, the contacting surface between the supporting and bearing surfaces 36, 38 may alternate between circular and planar or a combination thereof.

When the article support 18 comprises a plurality of supporting surfaces 36, at least one supporting surface 36 is at least partially oriented perpendicularly to the longitudinal lamination axis A to transmit forces extending along the longitudinal lamination axis A. Furthermore, at least one supporting surface 36 is at least partially perpendicular to a direction extending perpendicularly to the longitudinal lamination axis A to transmit forces extending in a direction perpendicular to the longitudinal lamination axis A. In other words, a first surface portion of the article support 18 is oriented perpendicularly to the longitudinal lamination axis A and a second surface portion of the article support 18 is oriented perpendicularly to a direction extending perpendicularly to the longitudinal lamination axis A.

The at least one supporting surface 36 is preferably continuous. Alternatively, the at least one supporting surface 36 may be discontinuous. The at least one supporting surface 36 may also comprise protrusions and/or recesses.

In the example of FIG. 2, the article support 18 comprises a recess 35 within which a supporting surface 36 is formed. Particularly, the supporting surface 36 is a cylindrical lateral wall of the recess 35 and the bearing surface 38 is a cylindrical wall of the surfacing blocker 22.

Figure 3:
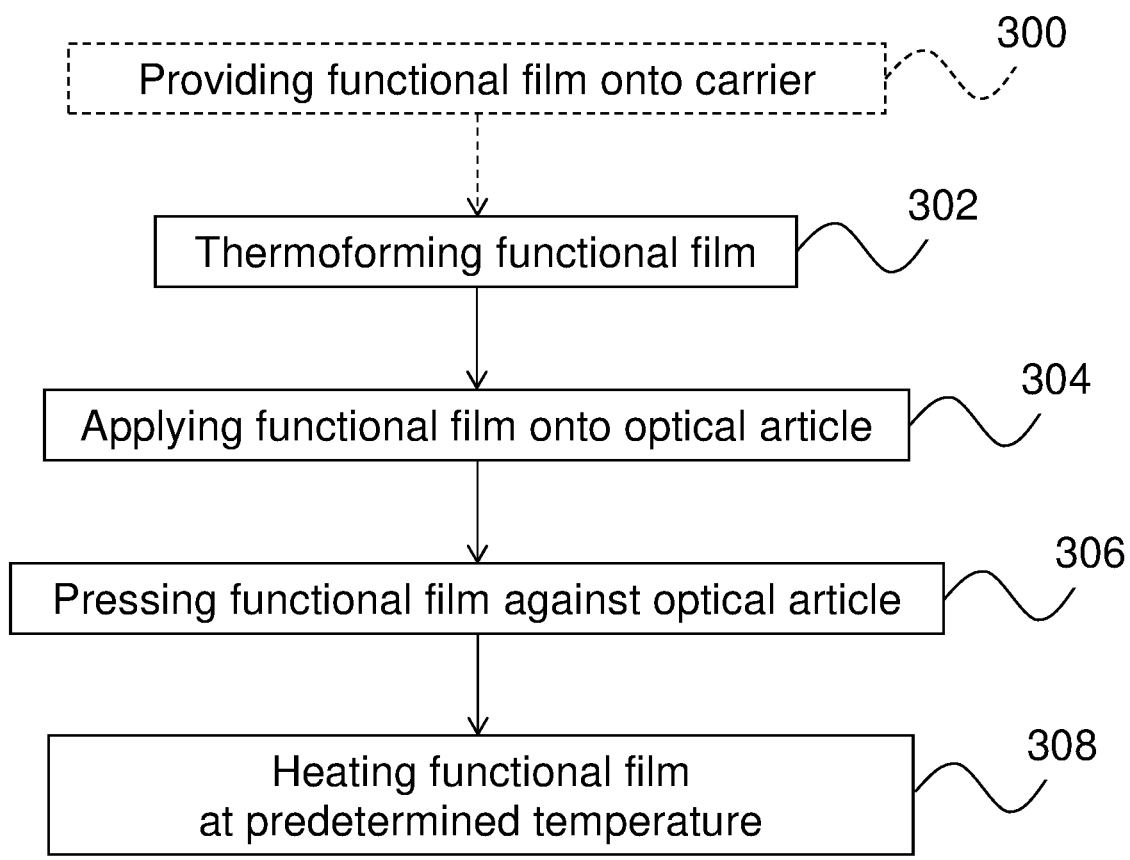
FIG. 3 is a flowchart showing steps of a method of laminating a functional film onto an optical article according to the disclosure, in a particular embodiment.

A method of laminating the functional film 12 onto the optical article 14 is described below with reference to FIG. 3.

A thermoforming step 302 is performed so as to provide the functional film 12 with a predetermined target curvature based on a curvature of a face F of the optical article 14 on which the functional film 12 is to be applied.

Then, a step 304 of applying the functional film 12 onto the face F of the optical article 14 is performed. Step 304 may amount to bringing the functional film 12 in contact with the face F or, if an adhesive substance is present on the face F, bringing the functional film 12 in contact with the adhesive substance.

The following step 306 comprises pressing the functional film 12 against the face F of the optical article 14 so as to adhere the functional film 12 to the face F of the optical article 14, by applying a predetermined pressure along the longitudinal lamination axis A through the actuating member 20.

According to the disclosure, an additional step 308 is carried out after the applying step 304. The additional step 308 comprises heating the functional film 12 at at least one predetermined temperature, so that the functional film 12 conforms to the curvature of the face F of the optical article 14.

In an embodiment, the heating may be done while applying a predetermined pressure on the functional film 12 to press it against the face F of the optical article 14.

As pressure is applied while the functional film 12 is heated, stresses may be relaxed in a shape that is as much as possible in conformity with the shape of the face F of the optical article 14.

Moreover, the performance of the adhesion of the functional film 12 to the face F of the optical article 14 is improved, because the pressure-sensitive adhesion may be obtained more quickly as the surfaces being in contact with each other are hotter.

Besides, the heated pressure-sensitive adhesive may become softer and may thus conform more easily to any small texturing of the surface, such as traces of engraving, e.g. microcircles or other markings.

In the above-described embodiment in which the heating is done while applying a predetermined pressure on the functional film 12, by way of non-limiting example, the heating may be done during step 306, through pressing the functional film 12 against the face F of the optical article 14 so as to adhere the functional film 12 to the face F of the optical article 14.

The heating may be done under approximately the same pressure as used while pressing the functional film 12 against the face F of the optical article 14.

The heating may be carried out for a duration comprised between e.g. 5 s and 30 min.

In the heating step 308, the heating may be carried out in accordance with a predetermined temperature profile.

In an embodiment, the heating may comprise a gradual heating phase and a subsequent cooling phase.

Optionally, a predetermined pressure may be applied to the functional film 12 during the cooling phase. The pressure will help settle the shape that the functional film 12 may take while cooling. In other words, in that case, part or all of the cooling phase is carried out while maintaining the film under pressure.

In an embodiment, the pressure is applied during the cooling phase at least until the temperature reaches 10° C. below the maximum temperature of the heating step, for example at least 20° C. below said temperature. In a further embodiment, the pressure is applied during the cooling phase at least until the temperature reaches a value below 50° C. or even below 40° C. In a particular application of these embodiments, the temperature mentioned above may be defined as the temperature of the pressurized air that applies the pressure.

In an embodiment, the heating step 308 may be carried out at least partially during the pressing step 306. For example, a temperature increase profile may be followed throughout the pressing step 306 and a temperature decrease profile may then be followed during and/or after the pressing step 306.

Alternatively, the heating step 308 may be carried out after applying a predetermined pressure on the functional film 12 to press it against the face F of the optical article 14 for a predetermined amount of time. By way of non-limiting example, the heating step 308 may be carried out after the pressing step 306, namely after pressing for a predetermined amount of time the functional film 12 against the face F of the optical article 14 so as to adhere it to the face F.

In any of the above embodiments, the heating may be carried out for a duration comprised between e.g. 5 s and 30 min.

In a particular embodiment, the heating step 308 may comprise using hot pressurized air flowing e.g. from a hot air shower. Pressurized air makes it possible to have a constant air flow entering the cavity 28.

Besides, using pressurized air to heat the functional film 12 avoids using ovens. This makes it possible, not only to save time by not having to manipulate the optical article 14 and by not changing machines, but also to heat evenly the surface of the functional film 12.

Furthermore, applying pressurized air on the functional film 12 and not placing the optical article 14 in an oven makes it possible to reduce the heat transferred to the optical article 14 and in particular to the face of the optical article 14 opposite to the face F, which is of interest if that opposite face has a hard coat and/or an antireflective stack and/or other temperature-sensitive added values.

In addition, pressurized air may be used for maintaining the functional film 12 under pressure during the heating in step 308. The desired pressure may be obtained e.g. by monitoring the air outlet of the cavity 28.

Alternatively, the heating step 308 may comprise using hot air blowing, or an infrared heater, or bringing the functional film 12 in contact with a heated fluid or solid element or any other appropriate heating technique.

By way of non-limiting example, the heating temperature may be comprised between 50° C. and 160° C. and is preferably comprised between 90° C. and 120° C.

In a particular embodiment where an optional step 300 comprises providing the functional film 12 onto a carrier before the thermoforming step 302, the heating step 308 may comprise heating a side of the carrier opposite to the face F of the optical article 14.

In a particular embodiment, the heating step 308 may be performed conditionally based on a calculated minimum curvature difference between the thermoformed functional film 12 and the curvature of the face F of the optical article 14 in at least one meridian.

For example, the heating step 308 may be performed as long as the measured curvature difference exceeds the above-mentioned calculated minimum curvature difference. The heating step 308 may then be stopped when the measured curvature difference equals the calculated minimum curvature difference.

The curvature difference may be measured continuously or at given time instants, e.g. periodically.

At least one of the front and rear faces of an optical article such as an ophthalmic lens may be coated by a functional film laminated onto the optical article by implementing a method as described above.

Although representative systems and methods have been described in detail herein, those skilled in the art will recognize that various substitutions and modifications may be made without departing from the scope of what is described and defined by the appended claims.

The invention claimed is:

1. A method of laminating a functional film onto an optical article, comprising:
    thermoforming said functional film so as to provide said functional film with a predetermined target curvature based on a curvature of a face of said optical article on which said functional film is to be applied;
    applying said functional film onto said face of said optical article;
    pressing said functional film against said face of said optical article so as to adhere said functional film to said face of said optical article by a pressure sensitive adhesive;
    wherein said method further comprises heating said functional film at at least one predetermined temperature after said applying, so that said functional film conforms to the curvature of said face of said optical article;
    wherein said heating is carried out in accordance with a predetermined temperature profile;
    wherein said predetermined temperature profile comprises a gradual heating phase and a subsequent cooling phase; and
    wherein a predetermined pressure is applied to said functional film during said cooling phase.

2. The method according to claim 1, wherein said heating uses hot pressurized air.

3. The method according to claim 2, wherein said pressurized air is used for maintaining said functional film under pressure during said heating.

4. The method according to claim 3, wherein said heating is done while applying a predetermined pressure on said functional film to press the functional film against said face of said optical article.

5. The method according to claim 2, wherein said heating is done while applying a predetermined pressure on said functional film to press the functional film against said face of said optical article.

6. The method according to claim 2, wherein said heating is done after applying a predetermined pressure on said functional film to press the functional film against said face of said optical article for a predetermined amount of time.

7. The method according to claim 1, wherein said heating is done while applying a predetermined pressure on said functional film to press the functional film against said face of said optical article.

8. The method according to claim 7, wherein said heating is done during said pressing said functional film against said face of said optical article.

9. The method according to claim 1, wherein said heating is done after applying a predetermined pressure on said functional film to press the functional film against said face of said optical article for a predetermined amount of time.

10. The method according to claim 1, wherein said heating is carried out for a duration comprised between 5 s and 30 min.

11. The method according to claim 1, wherein said at least one predetermined temperature is between 50° C. and 160° C.

12. The method according to claim 1, further comprising, prior to said thermoforming, providing said functional film onto a carrier, wherein said heating comprises heating a side of said carrier opposite to said face of said optical article.

13. The method according to claim 1, wherein laminating said functional film provides said face of said optical article with at least one coating among a hard coat, an anti-scratch coating, an antireflective coating, a polarizing coating, a tinted coating, a mirror coating, a coating filtering a predetermined range of wavelengths, an anti-smudge coating, an anti-fog coating, an antistatic coating, a coating having self-healing and/or self-cleaning properties.

14. The method according to claim 1, wherein said functional film comprises at least one material among cellulose triacetate or TAC, polyethylene terephthalate or PET, polycarbonate or PC, polyvinyl alcohol or PVA, cyclic olefin copolymer or COC.

15. The method according to claim 1, wherein said optical article is an ophthalmic lens.

16. An optical article comprising a front face and a rear face, wherein at least one of said front and rear faces is coated by a functional film laminated onto said optical article by implementing a laminating method according to claim 1.

17. The method according to claim 1, wherein said at least one predetermined temperature is between 90° C. and 120° C.

* * * * *